(12) United States Patent  (10) Patent No.: US 12,116,130 B2
Bensmann  (45) Date of Patent: Oct. 15, 2024

(54) WING FOR AN AIRCRAFT INCLUDING HIGH-LIFT DEVICE HOLD-DOWN ARRANGEMENT

(71) Applicant: AIRBUS OPERATIONS GmbH, Hamburg (DE)

(72) Inventor: Stefan Bensmann, Weyhe (DE)

(73) Assignee: AIRBUS OPERATIONS GmbH, Hamburg (DE)

( * ) Notice: Subject to any disclaimer, the term of this patent is extended or adjusted under 35 U.S.C. 154(b) by 0 days.

(21) Appl. No.: 17/779,386

(22) PCT Filed: Nov. 17, 2020

(86) PCT No.: PCT/EP2020/082392
§ 371 (c)(1),
(2) Date: May 24, 2022

(87) PCT Pub. No.: WO2021/104940
PCT Pub. Date: Jun. 3, 2021

(65) Prior Publication Data
US 2022/0411043 A1    Dec. 29, 2022

(30) Foreign Application Priority Data
Nov. 25, 2019 (DE) ...................... 10 2019 131 844.0

(51) Int. Cl.
*B64C 9/02* (2006.01)
*B64C 9/24* (2006.01)

(52) U.S. Cl.
CPC . *B64C 9/02* (2013.01); *B64C 9/24* (2013.01)

(58) Field of Classification Search
CPC .................................... B64C 9/24; B64C 9/02
See application file for complete search history.

(56) References Cited

U.S. PATENT DOCUMENTS

| 4,595,158 A * | 6/1986 | Robinson ................ B64C 13/36 244/223 |
| 8,534,610 B1 * | 9/2013 | Pitt ........................ B64C 9/22 244/214 |

(Continued)

FOREIGN PATENT DOCUMENTS

| EP | 2 851 285 | 3/2015 |
| GB | 2 186 849 | 8/1987 |
| GB | 2 380 173 | 4/2003 |

OTHER PUBLICATIONS

International Search Report for PCT/EP2020/082392, mailed Feb. 19, 2021, 3 pages.

(Continued)

*Primary Examiner* — Brady W Frazier
*Assistant Examiner* — Shanna Danielle Glover
(74) *Attorney, Agent, or Firm* — Nixon & Vanderhye P.C.

(57) ABSTRACT

A wing for an aircraft is disclosed including a fixed wing, a high-lift device and a hold-down arrangement arranged between two supports of the high lift device having a first hold-down element attached to the high-lift device and a second hold-down element attached to the fixed wing. The first hold-down element contacts the second hold-down element when the high-lift device is in a retracted position in which it prevents a trailing edge of the high-lift device from detaching from an upper surface of the fixed wing when the fixed wing deforms in the spanwise direction. One of the hold-down elements is a load-limited hold-down element which comprises a hydraulic element that is configured to allow the high-lift device to move away from the fixed wing when a load acting through the hold-down arrangement exceeds an operational threshold.

8 Claims, 4 Drawing Sheets

(56) References Cited

U.S. PATENT DOCUMENTS

2005/0061922 A1     3/2005   Milliere
2014/0042276 A1*   2/2014   Parker ...................... B64C 9/02
                                                                          244/214

OTHER PUBLICATIONS

Written Opinion of the ISA for PCT/EP2020/082392, mailed Feb. 19, 2021, 8 pages.

\* cited by examiner

WING FOR AN AIRCRAFT INCLUDING HIGH-LIFT DEVICE HOLD-DOWN ARRANGEMENT

CROSS REFERENCE TO RELATED APPLICATIONS

The present application is a National Phase of International Application Number PCT/EP2020/082392 filed Nov. 17, 2020, which designated the U.S. and claims priority benefits from German Patent Application Number DE 10 2019 131 844.0 filed Nov. 25, 2019, the entire contents of each of which are hereby incorporated by reference.

The present invention is directed to a wing for an aircraft comprising a fixed wing, a high-lift device and a hold-down arrangement. The fixed wing has a leading edge extending along a spanwise direction of the fixed wing and an upper surface forming a suction side of the fixed wing. The high-lift device is movable between a retracted position and a deployed position and attached to the leading edge of the fixed wing via a first support and a second support. The first support is spaced apart from the second support in the spanwise direction. In the retracted position a trailing edge of the high-lift device is in extended contact with the upper surface of the fixed wing. The hold-down arrangement is arranged between the first support and the second support and comprises a first hold-down element attached to the high-lift device and a second hold-down element attached to the fixed wing. The hold-down arrangement is configured such that the first hold-down element only contacts the second hold-down element when the high-lift device is in the retracted position. In the retracted position of the high-lift device the hold-down arrangement prevents the trailing edge of the high-lift device from detaching from the upper surface of the fixed wing when the fixed wing deforms or bends in the spanwise direction. The invention is further directed to a hold-down arrangement and an aircraft comprising a wing.

High-lift devices such as slats are commonly mounted to a leading edge of a fixed wing of an aircraft using a first support and a second support. For example, slats are mounted using a master slat track and a slave slat track. Both slat tracks are driven, however only the master slat track fixes the position of the slat in a spanwise direction whereas the slave slat track does not fix the slat position in the spanwise direction but allows a spanwise displacement of the slat relative to the slave slat track. For aerodynamic reasons the slat is mounted to the fixed wing such that in the retracted position an upper surface of the slat extends flush with an upper surface of the fixed wing which forms the suction side of the wing. The slat is, in particular, arranged such that there is no gap between the upper surface of the fixed wing and the trailing edge of the slat, i.e., the trailing edge is in extended contact with the upper surface of the fixed wing, and the shape of the slat in the spanwise direction of the wing generally follows the shape of the fixed wing.

As the slat is mounted to the fixed wing in two points only which are spaced from one another in the spanwise direction of the wing, bending or deformation of the fixed wing along the spanwise direction is not or only partly transmitted to the slat. This may result in the trailing edge of the slat not being in continuous or extended contact with the upper surface of the fixed wing or even completely detaching from the upper surface. Also, the shape of the slat in the spanwise direction of the wing does not conform to the shape of the fixed wing anymore.

In order to ensure that the trailing edge of the high-lift device remains in extended contact with the upper surface of the fixed wing when the high-lift device is in the retracted position, a hold-down arrangement is provided between the first support and the second support which prevents the trailing edge of the high-lift device from detaching from the upper surface and forces the slat to deform with the fixed wing. To this end the hold-down arrangement comprises a first hold-down element attached to the high-lift device and a second hold-down element attached to the fixed wing. The hold-down elements are only in contact with each other when the slat is in the retracted position.

When a wing tip of the fixed wing bends upwards during flight, for example, due to the lift generated by the fixed wing, the second hold-down element pushes downwards against the first hold-down element due to the deformation of the fixed wing and forces the high-lift device to deform with the fixed wing. Thus, in essence a third contact point between the high-lift device and the fixed wing is created in addition to the first and second support which in the retracted position ensures that the high-lift device is forced to deform with the fixed wing so that the upper surface of the high-lift device remains flush with the upper surface of the fixed wing.

The transfer of the spanwise deformation from the fixed wing to the high-lift device by means of the hold-down arrangement requires a high-lift device that withstands the same spanwise deformation as the fixed wing and the loads generated by the hold-down arrangement. Thus, a high-lift device being forced to deform with the fixed wing and, thereby, provide the necessary aerodynamic performance has to be more robust and in consequence heavier than a high-lift device that does not follow the spanwise deformation of the fixed wing. Also, the fixed wing has to be more robust as it has to bear the additional loads that are required for deforming the high-lift device.

In view of the above it is an object of the present invention to provide an improved wing, an improved hold-down arrangement and an improved aircraft.

The problem underlying the present invention is solved by a wing and a hold-down arrangement according to the pending claims. Exemplary embodiments of the wing according to the present invention are the subject matter of the pending claims.

According to a first aspect the problem underlying the present invention is solved by a wing for an aircraft comprising a fixed wing, a high lift device and a hold-down arrangement. The fixed wing has a leading edge extending along a spanwise direction of the fixed wing and an upper surface forming a suction side of the fixed wing. The high-lift device is movable between a retracted position and a deployed position and attached to the leading edge of the fixed wing via a first support and a second support. The first support is spaced apart from the second support in the spanwise direction. In the retracted position a trailing edge of the high-lift device is in extended contact with the upper surface of the fixed wing. The hold-down arrangement is arranged between the first support and the second support and comprises a first hold-down element attached to the high-lift device and a second hold-down element attached to the fixed wing. The hold-down arrangement is configured such that the first hold-down element is in contact with the second hold-down element when the high-lift device is in the retracted position but is not in contact with the second hold-down in element when the high-lift device is in the deployed position. In the retracted position of the high-lift device the hold-down arrangement prevents the trailing edge of the high-lift device from detaching from the upper surface of the fixed wing when the fixed wing bends or deforms in the spanwise direction. One of the first hold-down element and the second hold-down element is a load-limited hold-down element. The one of first hold-down element and the second hold-down element not being the load-limited hold-down element is a rigid hold-down element. The load-limited hold-down element comprises an elastically deformable biasing means and a contact element. When the high-lift device is in the retracted position the contact element is in contact with the rigid hold-down element and the biasing means biases the contact element towards the rigid hold-down element with a biasing load. The load-limited hold-down element is configured such that a hold-down load transferred through the hold-down arrangement for preventing the trailing edge of the high-lift device from detaching from the upper surface of the fixed wing is transferred through the biasing means and the contact element onto the rigid hold-down element. The biasing means is further configured such that when the hold-down load does not exceed an operational threshold, a load exerted by the rigid-hold-down element onto the contact element does not exceed the biasing load so that the trailing edge of the high-lift device is prevented from detaching from the upper surface of the fixed wing, and when the hold-down load exceeds the operational threshold, the load exerted by the rigid hold-down element onto the contact element exceeds the biasing load and the biasing means deforms elastically so that the trailing edge of the high-lift device is not prevented from detaching from the upper surface of the fixed wing.

In other words, the present wing for an aircraft is, for example, a main wing with a fixed wing and a high-lift device in form of a slat. The fixed wing has a leading edge which extends along but not necessarily parallel to the spanwise direction of the fixed wing. An upper surface of the fixed wing forms a suction side of the fixed wing and may also be referred to as a suction surface of the fixed wing. The fixed wing extends in the spanwise direction between an inward or inboard end which may, for example, be adapted to be attached to a fuselage of an aircraft, and a wing tip which forms the outer or outboard end of the fixed wing.

When the aircraft is in flight, the lift created by the fixed wing deforms the wing. In particular, the wing is curved upwards such that the wing tip moves upwards relative to the inward end of the fixed wing. The amount by which the fixed wing bends or deforms depends on various factors among which are speed of the aircraft and weather conditions. For example, the deformation of the fixed wing increases considerably when an aircraft accelerated from take-off speed to cruise speed.

The high-lift device attached to the wing is mounted to the wing using only two supports, a first support and a second support. The supports which may, for example, be slat tracks are used to move the high-lift device between a retracted and one or more deployed positions. When the high-lift device is in the retracted position, its trailing edge shall for aerodynamic reasons be in extended contact with the upper surface of the fixed wing such that an upper surface of the high-lift device extends flush with the upper surface of the fixed wing, i.e., such that no gap exists between the upper surface of the fixed wing and the trailing edge of the high-lift device.

As previously discussed, due to the changing curvature of the fixed wing during flight and the fact that the high-lift device is only mounted in two points to the fixed wing, the slat does not deform with the fixed wing in the spanwise direction. Hence, a hold-down arrangement comprising a first and a second hold down element is used to provide a third contact point between the high-lift device and the fixed wing when the high-lift device has been retracted, i.e., is in the retracted position. The first hold-down element is attached or mounted to the high-lift device and the second hold-down element is mounted to the fixed wing such that the first hold-down element and the second hold-down element only come into contact or engage when the high-lift device is in the retracted position. By means of the hold-down arrangement it is ensured that a relative downward deformation of the fixed wing in the spanwise direction between the first and the second support of the high-lift device corresponding to an upward movement of the wing tip of the fixed wing relative to the fixed wing's inward end is transferred to the high-lift device such that the high-lift device follows the curvature or deformation of the fixed wing. As a result, the trailing edge of the high-lift device constantly maintains extended contact with the upper surface of the fixed wing.

However, according to the present invention one of the first and the second hold-down elements is a load-limited hold-down element and the other of the first and the second hold-down element is a rigid hold-down element. The load-limited hold-down element comprises a biasing means such as a spring which is elastically deformable. The biasing means is provided for biasing a contact element with a biasing load such that it pushes against the rigid hold-down element when the high-lift device is in the retracted position.

When the hold-down arrangement is under load during flight due to deformation of the fixed wing in the spanwise direction the biasing means and the rigid hold-down element act in opposing directions onto the rigid hold-down element, i.e., the biasing means pushes the contact element downwards whereas the rigid hold-down element pushes the contact element upwards. The biasing load exerted by the biasing means onto the contact element has been chosen such that as long as the hold-down load transferred through the hold-down arrangement for forcing the high-lift device to deform with the fixed wing does not exceed an operational threshold, the contact element is firmly held in position, for example, as defined by an end stop. Only if the operational threshold is exceeded, the biasing means is being elastically deformed, e.g., compressed, and the rigid hold-down element can push the contact element out of its original position. The high-lift device is then no longer forced to deform all the way with the fixed wing and the trailing edge of the high-lift device can detach from the upper surface of the fixed wing as the additional loads generated by a further deforming fixed wing are partly absorbed by the elastically deforming biasing means. This advantageously reduces the load that has to be borne by the high-lift device and the fixed wing. As the biasing means continues to act onto the contact element, there is however no sudden change but a gradual change in the load acting on the high-lift device so that the dynamics of the movement are dampened.

The operational threshold may, for example, be chosen such that the high-lift device is kept in extended contact with the upper surface of the fixed wing while deformation of the fixed wing is within limits that are experienced during regular flights but the trailing edge of the high-lift device is allowed to move away from the upper surface when deformations occur that are only experienced in extreme corners of the flight envelope in which the high-lift device is subject of very high loads caused by the enforced deformation and the reduced aerodynamic performance due to the trailing edge of the high-lift device detaching from the upper surface of the fixed wing are tolerable. In any case the operational threshold is chosen such that the load-limited hold-down element stops preventing the trailing edge of the high-lift device from detaching from the upper surface of the fixed wing well-before the deformation of the fixed wing reaches operational limits.

Thereby, the hold-down loads transmitted through the hold-down arrangement are advantageously limited to loads occurring during regular flight conditions for which it is essential to keep the trailing edge of the high-lift device in extended contact with the upper surface of the fixed wing to improve the aerodynamic performance of the fixed wing. However, during rare and extreme flight situations in which the curvature of the fixed wing along the spanwise direction exceeds commonly occurring curvatures, the load-limited hold-down element no longer forces the high-lift device to deform with the fixed wing. In such a rare case aerodynamic performance of the wing are of less concern and it is instead preferred to reduce the loads acting on the high-lift device and the fixed wing or, in other words, to limit the enforced deformation of the high-lift device. As the maximum deformation of the high-lift device is reduced as compared to a rigid or non-deforming hold-down element, the high-lift device may be constructed less robust. This may, in particular, advantageously allow reducing the weight of the high-lift device. Further, since the load on the fixed wing is also reduced as it does not have to bear the additional load that is required to deform the high-lift device.

The operational threshold may, for example, be chosen such that elastic deformation of the biasing means results in the biasing means not further acting onto the rigid hold-down element for preventing the trailing edge of the high-lift device from detaching from the upper surface of the fixed wing when a load factor exceeds a value of 2.0, preferably of 1.75 and most preferably of 1.3, where the load factor is defined as the ratio of lift of an aircraft to its weight.

In a preferred embodiment the second hold-down element is the load-limited hold-down element. In other words, it is preferred that the load-limited hold-down element is the hold-down element mounted to the fixed wing.

In another preferred embodiment the load-limited hold-down element further comprises a hydraulic device with a cylinder and a piston defining a first cavity filled with hydraulic fluid. The piston is the contact element of the load-limited hold-down element. The hydraulic device comprises a valve for closing an opening in the cylinder. The valve is configured to be movable between a first position and a second position. In the first position the valve closes the opening and in the second position the valve does not close the opening. When the high-lift device is in the retracted position, the biasing means biases the contact element towards the rigid hold-down element through the hydraulic fluid by biasing the valve towards the first position with the biasing load. The hydraulic device is further configured such that when the hold-down load does not exceed the operational threshold, a load acting through the hydraulic fluid onto the valve does not exceed the biasing load such that the valve is held in the first position by the biasing means, and when the hold-down load exceeds the operational threshold, a load acting through the hydraulic fluid onto the valve exceeds the biasing load, whereupon the valve moves towards the second position.

In other words, the load-limited hold-down element comprises a hydraulic device which is part of the load path used for transferring the hold-down load for holding the trailing edge of the retracted high-lift device in extended contact with the upper surface of the fixed wing between the fixed wing and the high-lift device. The hydraulic device itself comprises a first cavity for hydraulic fluid formed by a cylinder and a piston arranged inside the cylinder. The piston is the contact element of the load-limited high-lift device. Hence, the hydraulic device is essentially interposed between the biasing means and the contact element.

The hold-down load is transferred through the first cavity and the hydraulic fluid located therein and the hold-down arrangement is configured such that the high-lift device can only move relative to the fixed wing (which would enable the trailing edge of the high-lift device to detach from the upper surface of the fixed wing), when the piston is movable inside the cylinder.

The first cavity comprises an opening which is preferably arranged in a back wall of the cylinder. Through this opening hydraulic fluid can be displaced out of the first cavity by movement of the piston towards the back wall. In order to keep the hydraulic fluid in the cavity when the hold-down load does not exceed the operational threshold, a valve is provided which closes the opening in a sealing manner.

The valve is operated such that when the hold-down load is below an operational threshold, the valve is not released and keeps the opening closed. Hence, the load path holding the high-lift device in position is closed and the trailing edge of the high-lift device is kept in contact with the upper surface of the fixed wing. However, when the hold-down load exceeds the operation threshold, the valve is released and the opening is not kept close any further. The hydraulic fluid can, therefore, flow through the opening out of the first cavity which allows the piston to move. As the piston is now movable, the trailing edge of the high-lift device can detach from the upper surface of the fixed wing.

The position in which the valve closes the opening is also referred to as a first position and it can be moved to a second position. When the valve is moved towards the second position and is in the second position, the opening of the first cavity is not closed and hydraulic fluid can flow into and out of the first cavity.

In the preferred embodiment the biasing means acts with a biasing load onto the valve. The biasing load has been chosen such that when the hold-down load does not exceed the operational threshold, the biasing load acting onto the valve exceeds a load exerted by the hydraulic fluid in the first cavity on the load. Hence, the load path through the load-limited hold-down element is established and the trailing edge of the high-lift device cannot detach from the upper surface of the fixed wing.

The biasing load has further been adjusted such that when the hold-down load exceeds the operational threshold, a load exerted by the hydraulic fluid onto the valve exceeds the biasing load and the valve is pushed out of the first position and towards (but not necessarily all the way to) the second position. Since the opening is no longer closed by the valve, hydraulic fluid can be displaced from the first cavity and the piston can move inside the cylinder. With the piston the rigid hold-down element can also move relative to the load-limited hold-down element which allows the high-lift device to move relative to the fixed wing and the trailing edge of the fixed wing to detach from the upper surface of the fixed wing.

The biasing load required to keep the valve in place depends on the operational threshold and the size of the opening that defines the load that the hydraulic fluid in the first cavity exerts onto the valve. Thus, by keeping the opening smaller, smaller biasing loads are required to the keep the valve in the first position. On the other hand, the hydraulic fluid will take longer to flow out of the first cavity when the valve opens which leads to an increase in the time it takes for the high-lift device to be released when the operation threshold is reached. Hence, the hydraulic device dampens the loosening of the enforced deformation of the high-lift device, thereby reducing dynamic effects that the high-lift device and the fixed wing have to withstand.

Preferably, the hydraulic device comprises a second cavity, wherein hydraulic fluid displaced out of the first cavity through the opening is received in the second cavity. The second cavity thus serves as a reservoir which takes up the hydraulic fluid displaced from the first cavity when the hold-down load exceeds the operational threshold.

In a preferred embodiment, the valve is arranged in the second cavity and a position of the valve in the second cavity defines the volume available for receiving hydraulic fluid displaced from the first cavity, wherein when the hold-down load exceeds the operational threshold, the valve is moved relative away from the first position by the hydraulic fluid displaced from the first cavity against the biasing load exerted by the biasing means onto the valve.

In other words, in the preferred embodiment the valve serves as a piston in a cylinder formed by the second cavity. The valve is displaced by the hydraulic fluid flowing through the opening towards the second position and preferably all hydraulic fluid is captured in the second cavity. As the biasing load continues to act onto the valve, the hydraulic fluid needs to continuously overcome the biasing load to further push the valve towards the second position. This may result in an only gradual release of the high-lift device. On the other hand, when the hold-down load goes back down below the operational threshold, the biasing means can push the hydraulic liquid with the valve back through the opening into the first cavity. Once the valve is closed, the hydraulic device forms a rigid element in the load path provided by the hold-down arrangement between the fixed wing and the high-lift device and the high-lift device is forced to deform with the fixed wing again.

In an alternative embodiment, the volume of the second cavity is fixed and exceeds a volume of the first cavity. Thus, once the valve is open, all of the hydraulic fluid from the first cavity can flow out of the first cavity into the second cavity. The release of the high-lift device is, therefore, only dependent on the time it requires for the hydraulic fluid to flow through the opening. However, in this embodiment the valve and the biasing means cannot automatically restore the load path for keeping the trailing edge of the high-lift device in extended contact with the upper surface of the fixed wing when the hold-down load does not exceed the operational threshold any more.

In a preferred embodiment the high-lift device is a slat, wherein the first support is preferably a master slat track and the second support is preferably a slave slat track.

In a second aspect the problem underlying the present invention is solved by a hold-down arrangement for a wing of an aircraft. The wing comprises a fixed wing and a high-lift device, wherein the wing has a leading edge extending along a spanwise direction of the fixed wing and an upper surface forming a suction side of the fixed wing and wherein the high-lift device is movable between a retracted position and a deployed position and attached to the leading edge of the fixed wing via a first support and a second support, wherein the first support is spaced apart from the second support in the spanwise direction and wherein in the retracted position a trailing edge of the high-lift device is in extended contact with the upper surface of the fixed wing. The hold-down arrangement comprises a first hold-down element attachable to the high-lift device of the wing and a second hold-down element attachable to the fixed wing of the wing such that the first hold-down element is in contact with the second hold-down element when the high-lift device is in the retracted position but is not in contact when the high-lift device is in the deployed position, that the hold-down arrangement is arranged between the first support and the second support of the wing and that in the retracted position of the high-lift device the hold-down arrangement prevents the trailing edge of the high-lift device from detaching from the upper surface of the fixed wing when the fixed wing deforms in the spanwise direction. One of the first hold-down element and the second hold-down element is a load-limited hold-down element. The one of first hold-down element and the second hold-down element not being the load-limited hold-down element is a rigid hold-down element. The load-limited hold-down element comprises an elastically deformable biasing means and a contact element. When the high-lift device is in the retracted position the contact element is in contact with the rigid hold-down element and the biasing means biases the contact element towards the rigid hold-down element with a biasing load. The load-limited hold-down element is configured such that a hold-down load transferred through the hold-down arrangement for preventing the trailing edge of the high-lift device from detaching from the upper surface of the fixed wing is transferred through the biasing means and the contact element onto the rigid hold-down element. The biasing means is further configured such that when the hold-down load does not exceed an operational threshold, a load exerted by the rigid-hold-down element onto the contact element does not exceed the biasing load so that the trailing edge of the high-lift device is prevented from detaching from the upper surface of the fixed wing, and when the hold-down load exceeds the operational threshold, the load exerted by the rigid hold-down element onto the contact element exceeds the biasing load and the biasing means deforms elastically so that the trailing edge of the high-lift device is not prevented from detaching from the upper surface of the fixed wing.

The hold-down arrangement may be configured in the same way as the hold-down arrangement which has been described as part of the preferred embodiments of a wing for an aircraft. For the sake of brevity, details of these embodiments are not repeated here but reference is made to the preceding description. The advantages of the hold-down arrangement correspond to the advantages of the respective embodiments of a wing for an aircraft.

In a preferred exemplary aspect the problem underlying the present invention is solved by using a hold-down arrangement in a wing of an aircraft. The wing comprises a fixed wing and a high-lift device, wherein the wing has a leading edge extending along a spanwise direction of the fixed wing and an upper surface forming a suction side of the fixed wing and wherein the high-lift device is movable between a retracted position and a deployed position and attached to the leading edge of the fixed wing via a first support and a second support, wherein the first support is spaced apart from the second support in the spanwise direction and wherein in the retracted position a trailing edge of the high-lift device is in extended contact with the upper surface of the fixed wing. The hold-down arrangement comprises a first hold-down element attachable to the high-lift device of the wing and a second hold-down element attachable to the fixed wing of the wing such that the first hold-down element is in contact with the second hold-down element when the high-lift device is in the retracted position and is not in contact with the second hold-down element when the high-lift device is in the deployed position, that the hold-down arrangement is arranged between the first support and the second support of the wing and that in the retracted position of the high-lift device the hold-down arrangement prevents the trailing edge of the high-lift device from detaching from the upper surface of the fixed wing when the fixed wing deforms in the spanwise direction. One of the first hold-down element and the second hold-down element is a load-limited hold-down element. The one of first hold-down element and the second hold-down element not being the load-limited hold-down element is a rigid hold-down element. The load-limited hold-down element comprises an elastically deformable biasing means and a contact element. When the high-lift device is in the retracted position the contact element is in contact with the rigid hold-down element and the biasing means biases the contact element towards the rigid hold-down element with a biasing load. The load-limited hold-down element is configured such that a hold-down load transferred through the hold-down arrangement for preventing the trailing edge of the high-lift device from detaching from the upper surface of the fixed wing is transferred through the biasing means and the contact element onto the rigid hold-down element. The biasing means is further configured such that when the hold-down load does not exceed an operational threshold, a load exerted by the rigid-hold-down element onto the contact element does not exceed the biasing load so that the trailing edge of the high-lift device is prevented from detaching from the upper surface of the fixed wing, and when the hold-down load exceeds the operational threshold, the load exerted by the rigid hold-down element onto the contact element exceeds the biasing load and the biasing means deforms elastically so that the trailing edge of the high-lift device is not prevented from detaching from the upper surface of the fixed wing.

The hold-down arrangement used in the wing may in particular correspond to the different embodiments of hold-down arrangements previously described.

Finally, in a further aspect an aircraft comprising a fuselage and a wing as in the previously described embodiments solves the problem underlying the present invention. The advantages of the aircraft correspond to the advantages of the respective embodiment of a wing comprised therein.

In the following, exemplary embodiments of a wing for an aircraft including exemplary embodiments of a hold-down arrangement will be described with reference to the drawings, wherein.

In the following description of exemplary embodiments of aircraft, wings for aircraft and hold-down arrangements like elements will be designated with like reference numerals throughout all drawings. The description will commence with FIG. 1 where an exemplary embodiment of an aircraft is shown, continue with FIGS. 2 and 3 which show a schematic drawing of a section of an exemplary embodiment of a wing and finally turn towards FIGS. 4a, 4b and 4c as well as FIG. 5, which each show a sectional drawing of a wing with a hold-down arrangement.

Figure 1:
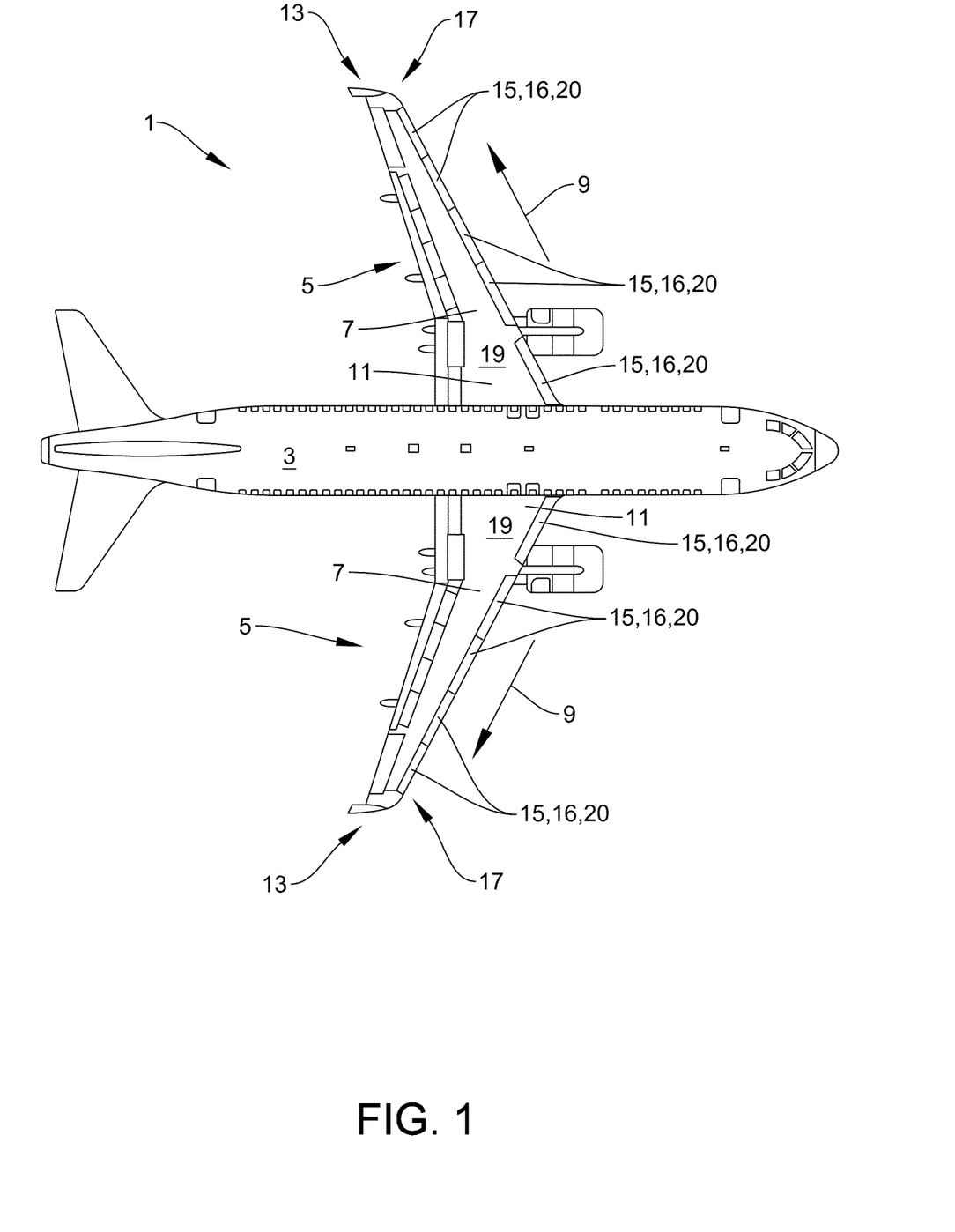
FIG. 1 shows an exemplary embodiment of an aircraft with an exemplary embodiment of a wing.

FIG. 1 shows a top view of an exemplary embodiment of an aircraft 1 with a fuselage 3 and two wings 5. Each wing 5 comprises a fixed wing 7 extending in a spanwise direction 9 between an inward end or wing root 11 and an outward end or wing tip 13. The wings 5 further comprise a plurality of high-lift devices 15 in form of slats 16 mounted to the leading edge 17 of the fixed wings 7. Since FIG. 1 shows a top view of the aircraft 1, the upper surfaces 19, 20 forming the respective suction side of the fixed wings 7 and the high-lift devices 15 are visible. In FIG. 1 the high-lift devices 15 are shown in respective retracted positions in which the upper surfaces 20 of the high-lift devices 15 extend flush with the upper surfaces 19 of the fixed wings 5.

Figure 2:
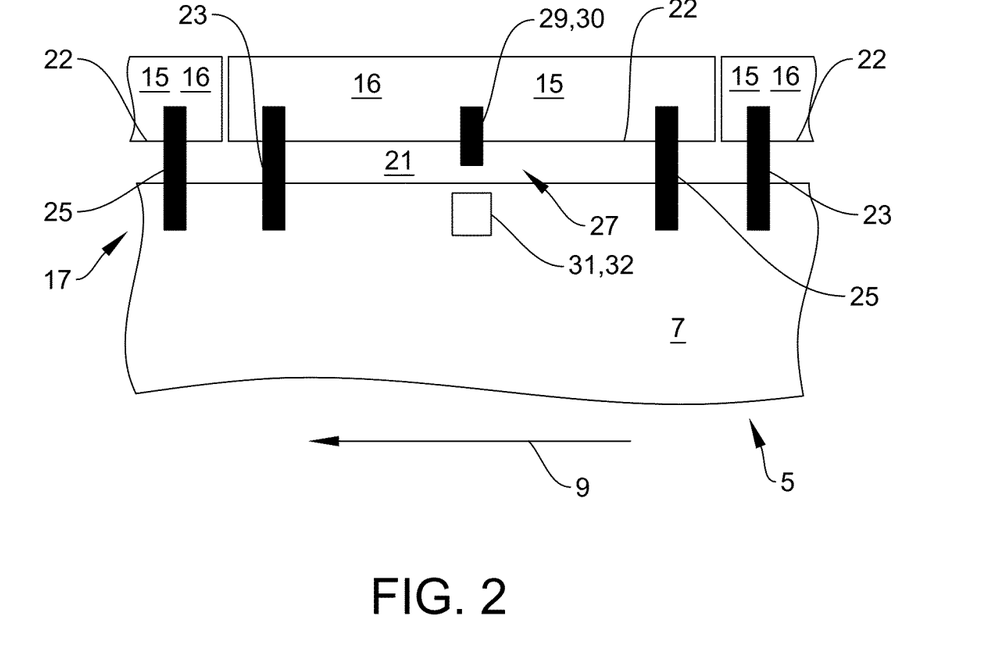
FIG. 2 shows a schematic drawing of an exemplary embodiment of a wing with an exemplary embodiment of a hold-down arrangement with a high-lift device in a deployed position.
Figure 3:
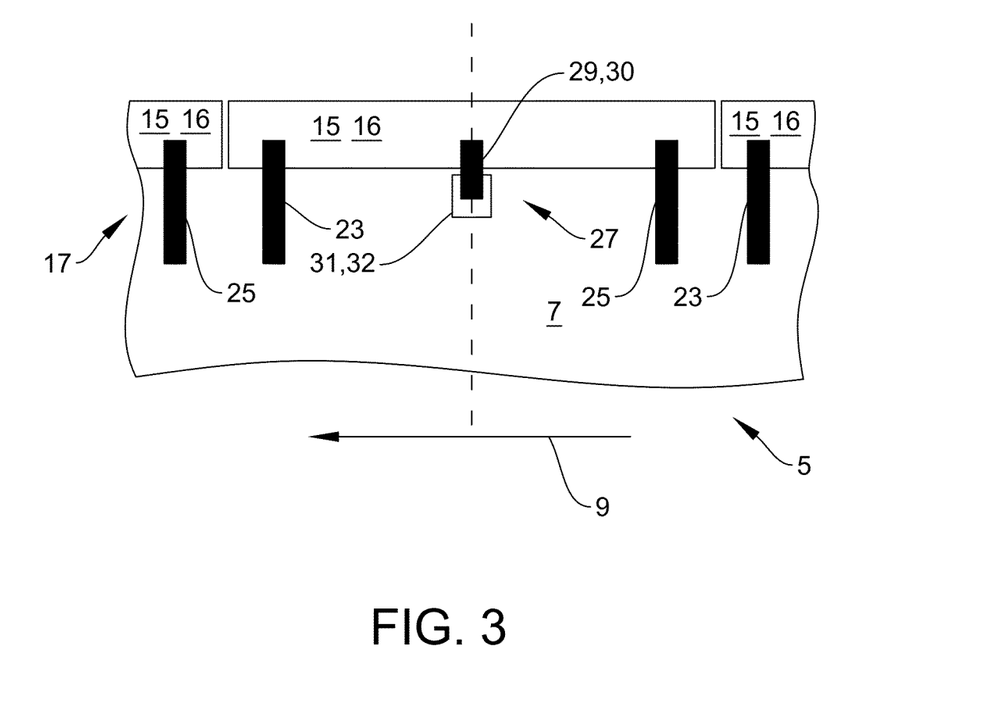
FIG. 3 shows a schematic drawing of the exemplary embodiment of a wing of FIG. 2 with the high-lift device in retracted deployed position.

FIGS. 2 and 3 each show a schematic view of a section of an exemplary embodiment of a wing 5 from below the wing 5, i.e., from the opposing side of the upper surface 19 shown in FIG. 1. The wing 5 may, in particular, be one of the wings 5 shown in FIG. 1. It comprises a fixed wing 7 and three high-lift devices 15 in form of slats 16 mounted to the leading edge 17 of the fixed wing 7. The fixed wing 7 and the inner and outer high-lift device 15 are shown in FIGS. 2 and 3 only partially. For example, neither the full length of the wing 5 in in the spanwise direction 9 nor its complete extension in the cordline direction are shown. Similarly, the inner and outer high-lift devices 15 shown in FIGS. 2 and 3 are also only shown in part in the spanwise direction 9 of the fixed wing 7.

Figure 4A:
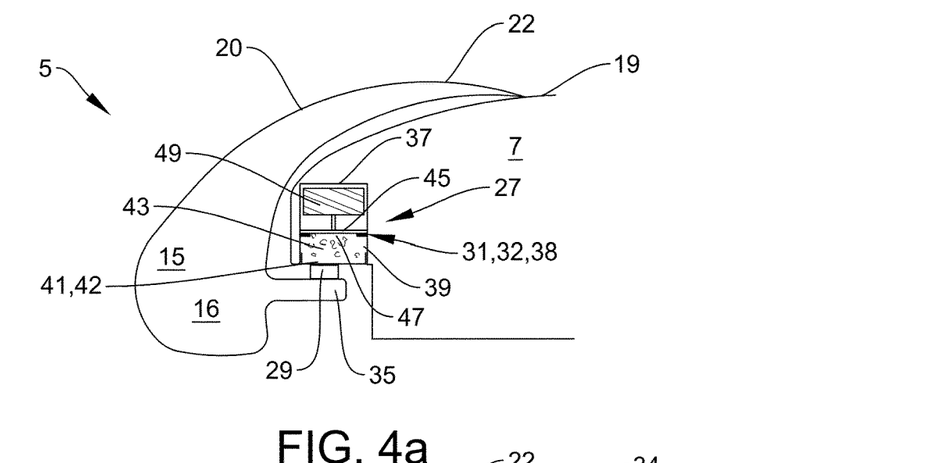
FIG. 4a shows sectional drawing of an exemplary embodiment of a wing comprising an exemplary embodiment of a hold-down arrangement.
Figure 4B:
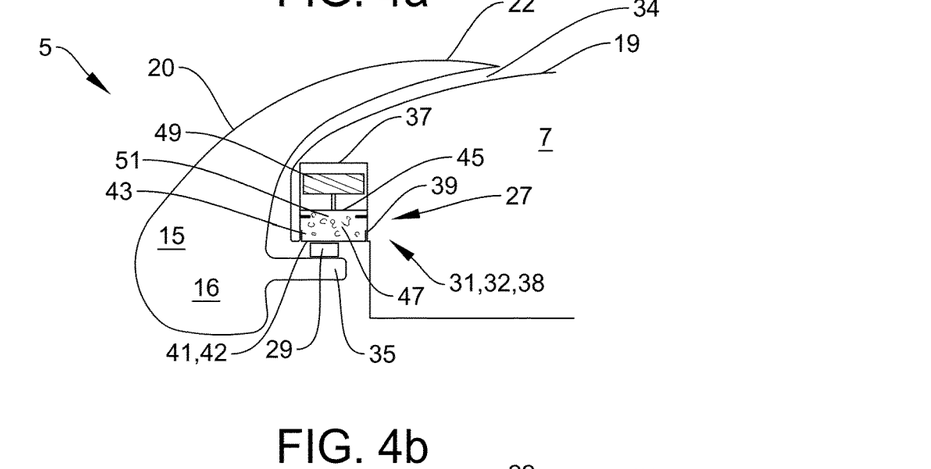
FIG. 4b shows a second drawing of the exemplary embodiments of FIG. 4a, FIG. 5 shows a sectional drawing of another exemplary embodiment of a wing comprising another exemplary embodiment of a hold-down arrangement
Figure 5:
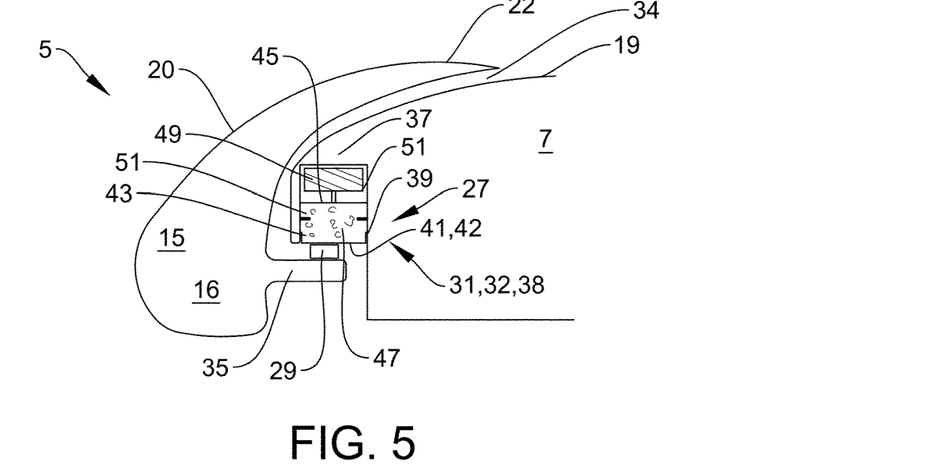
FIG. 5 shows a sectional drawing of another exemplary embodiment of a wing comprising another exemplary embodiment of a hold-down arrangement.

In FIG. 2 the high-lift devices 15 are shown in a deployed position indicated by a gap 21 between the fixed wing 7 and the high-lift devices 15; in FIG. 3 the high-lift devices are shown in a retracted position in which the high-lift devices 15 overlap with the fixed wing 7 and are partly hidden behind the fixed wing 7. The high-lift devices 15 are mounted to the fixed wing 7 such that their respective trailing edges 22 (only visible in FIG. 2) are in extended contact with the upper surface 19 of the fixed wing 7. Since FIGS. 2 and 3 show the wing 5 from below, the trailing edges 22 of the high-lift devices 15 are not visible in FIG. 3. However, for the sake of completeness it is noted that a trailing edge 22 of a high-lift device 15 in extended contact with the upper surface 19 of a fixed wing 7 is shown in FIGS. 4a, 4b, and 5.

Each of the high-lift devices 15 is mounted to the leading edge 17 of the fixed wing 7 via a first support 23 and a second support 25. The supports 23, 25 are spaced apart from one another in the spanwise direction 9 of the wing 5 and enable the movement of the high-lift devices 15 between the deployed position shown in FIG. 2 and the retracted position shown in FIG. 3. One of the first and second supports 23, 25, for example, the respective first supports 23 may be driven via a drive unit (not shown) for moving the high-lift devices or slats 15. The second supports 25 may be not driven such that they only follow the motion induced by the first support 23. In such an embodiment where the high-lift devices 15 are slats 16, the first supports 23 may also be referred to as master slat tracks 23 and the second supports 25 may also be referred to as slave slat tracks 25.

As previously discussed, the lift and drag on the fixed wing 7 as well as other motions of the aircraft 1 cause deformations of the fixed wing 7 along the spanwise direction 9 of the wing 5. As each high-lift device 15 is only attached via two supports 23, 25 to the fixed wing 7, the deformation of the fixed wing 7 along the spanwise direction is not transmitted to the high-lift device. In particular, any upwards bending of the wing tip 13 caused by the increasing lift of the wing 5 with increasing velocity of the aircraft 1 would cause the fixed wing 7 to move downwards relative to the trailing edge 22 of the high-lift devices 15 in the region between the first and second supports 23, 25. This may cause the respective trailing edges 22 of the high-lift devices 15 to detach from the upper surface 19 of the fixed wing 7 so that the upper surfaces 19, 20 of the fixed wing 7 and the high-lift devices 15 are no longer flush and the aerodynamic performance of the wing 5 are affected negatively. In particular, the drag may be increased.

Hence, for each of the high-lift devices 15 a hold-down arrangement 27 is provided which comprises a first hold-down element 29 attached to the respective high-lift device 15 and a second hold-down element 31 attached to the fixed wing 7. Only the hold-down arrangement 27 of the high-lift device 15 in the center of FIGS. 2 and 3 is shown. The hold-down arrangement 27 is arranged between first and second supports 23, 25 of the respective high-lift device 15.

As can be seen in FIGS. 2 and 3, when the high-lift devices 15 are in their respective deployed position, the first hold-down element 29 attached to the high-lift device 15 is not in contact with the second hold-down element 31 attached to the fixed wing 7. However, when the high-lift device 15 is in the retracted position, the first hold-down element 29 comes into contact with the second hold-down element 31. In other words, the first hold-down element 29 is only in contact with the second hold-down element 31 when the high-lift device 15 to which the first hold-down element 29 is mounted is in its retracted position. It should be pointed out that for technical reason a first contact will need to be established before the high-lift device 15 has reached its final retracted position. However, the contact is essentially limited to the retracted position.

Once the first and second hold-down elements 29, 31 have come into contact or have been brought into engagement with one another, the second hold-down element 31 holds the first hold-down element 29 down and thus transmits any relative downward bending or deformation of the fixed wing 7 to the high-lift device 15. Thereby, the trailing edge 22 of the high-lift device 15 is prevented from detaching from the upper surface 20 of the fixed wing 7.

In order to limit the enforced deformation of the high-lift device 15, the first hold-down element is formed as a rigid hold-down element 30 and the second hold-down element 31 is formed as a load-limited hold-down element 32 which comprises a hydraulic device (not shown in FIGS. 2 and 3) with a cylinder and a piston defining a first cavity. The first cavity is filled with a hydraulic fluid which can flow into and out of the first cavity through an opening.

A valve is provided for closing and opening the opening in the first cavity. No hydraulic fluid can flow out of or into the first cavity through the opening when the valve is not released. When the valve is released, the opening is not closed and hydraulic fluid can flow out of or into the first cavity.

The valve is operated such that when the hold-down load acting through the hold-down arrangement 27 does not exceed an operational threshold, the valve is kept closed and no hydraulic liquid can be displaced from the first cavity. Hence, the hold-down arrangement 27 acts onto the high-lift device 15 and keeps the trailing edge 22 of the high-lift device 15 in extended contact with the upper surface 19 of the fixed wing 7.

When the hold-down load exceeds the operational threshold, the valve is opened or released such that hydraulic liquid can flow through the opening out of the cylinder. This allows the first and second hold-down element 29, 31 to move relative to one another. With the first hold-down element the high-lift device 15 can move and its trailing edge 22 can detach from the upper surface 19 of the fixed wing 7.

The operational threshold is chosen such that the hold-down arrangement 27 prevents the trailing edge 22 of the high-lift device 15 from detaching from the upper surface 19 of the fixed wing 7 during regular flight conditions and common flight maneuvers. When the loads exceed the operational threshold, i.e., reach the structural or operational limits of the slats 16, for example, when the aircraft 1 operates in corners of the flight envelope, i.e., during extreme flight conditions, the biasing means deforms elastically to a degree that the connection between the fixed wing 7 and the high-lift device 15 provided by the hold-down arrangement 27.

FIGS. 4 and 4b shows a more detailed exemplary embodiment of a wing 5 comprising an exemplary embodiment of a hold-down arrangement 27. The wing 5 may, for example, be the wing 5 of FIG. 1, 2 or 3. Only a partial section through the wing 5 is shown in in FIGS. 4a and 4b which may, for example, be taken along the dashed line 33 in FIG. 3. With regard to features of the wing 5 not shown in FIGS. 4a and 4b reference is made to FIGS. 1 to 3.

The wing 5 shown in FIGS. 4a and 4b also comprises a fixed wing 7 to which a high-lift device 15 in form of a slat 16 is mounted using two supports (not shown). In FIGS. 4a and 4b the slat 16 is shown in the retracted position. FIG. 4a shows the wing 5 with the trailing edge 22 of the high lift device 15 being in extended contact with the upper surface 19 of the fixed wing 7 such that the upper surfaces 19, 20 of the high-lift device 15 and the fixed wing 7 form a continuous surface. In FIG. 5, the trailing edge 22 of the high-lift device 15 has detached from the upper surface 19 of the fixed wing 7 as indicated by a gap 34.

The wing 5 comprises a hold-down arrangement 27 with a first and a second hold down element 29, 31. The first hold-down element 29 is mounted to a hold-down rib 35 of the slat 15 and adjustable in that its height relative to the hold-down rib 35 can be adjusted to adapt the position of the slat 15 in its retracted position. The first hold-down element 29 is in contact with the second hold-down element 31 that is also part of the hold-down arrangement 27.

The second hold-down element 31 is a load-limited hold-down element 32 that is mounted to the fixed wing 7 via a rib 37. The load-limited hold-down element 32 comprises a hydraulic device 38 comprising a cylinder 39 and a piston 41 forming a first cavity 43 which is filled with a hydraulic fluid. The piston 41 forms a contact element 42 which is in contact with the first hold-down element 29. Further, a valve 45 is provided for closing an opening 47 in the cylinder 39 through which the hydraulic liquid can flow into and out of the first cavity 43. In FIG. 4a the valve 45 is shown in a first position where the opening 47 is closed and in FIG. 4b the valve 45 has been moved towards a second position and the opening 47 is open.

Further, a biasing means 49 in form of a spring 49 is provided which biases the valve 45 with a biasing load towards the first position. The biasing load is chosen such that it exceeds the force exerted onto the valve 45 by the hydraulic fluid in the first cavity 43 as long as the hold-down load does not exceed the operational threshold. In this case, the load path from the fixed wing 7 to the high-lift device 15 is completed and its trailing edge 22 is maintained in extended contact with the upper surface 19 of the fixed wing 7 as shown in FIG. 4a.

However, when the hold-down load exceeds the predetermined threshold, the load exerted by the hydraulic fluid onto the valve 45 exceeds biasing load and the valve 45 moves towards the second position. The opening 47 is thus no longer blocked by the valve 45 and the hydraulic liquid can flow out of the first cavity 43 into a second cavity 51. Hence, the piston 41 may move relative to the cylinder 39. With the cylinder 41 the entire high-lift device 15 may move such that trailing edge 22 can detach from the upper surface 19 of the fixed wing 7 as shown in FIG. 4b.

Hence, the load path provided when the hold-down load is below the operation threshold is disconnected when the operational threshold is exceeded and the high-lift device 15 is no longer forced to deform with a relatively downward deforming fixed wing 7 and the loads acting on the high-lift device 15 are considerably reduced.

As can be seen in FIG. 4b, the second cavity 51 is delimited by the valve 45. Hence, in order to increase the volume of the second cavity 51 further, the biasing means 49 needs to be compressed further. The high-lift device 15 is therefore only gradually released.

FIG. 5 shows another exemplary embodiment of a wing 5 comprising an exemplary embodiment of a hold-down arrangement 27. The wing 5 and the hold-down arrangement 27 of FIG. 5 only differ from the wing 5 and the hold-down arrangement 27 of FIGS. 4a and 4b in the way the second cavity 51 is formed. Thus, the description of the embodiments of FIG. 5 will be limited to those aspects that differ from the embodiment of FIGS. 4a and 4b. The wing 5 shown in FIG. 5 may be a cut through the wing 5 shown in FIGS. 2 and 3 along the dashed line 33 and shows the wing 5 in the same configuration as shown in FIG. 4b.

As can be seen in FIG. 5, the volume of the second cavity 51 is fixed, does not depend on the position of the valve 45 and exceeds the volume of the first cavity 43. Hence, as soon as the valve 45 is moved out of the first position and the opening 47 is not closed any further, all hydraulic fluid can flow out of the first cavity 43 and the load path from the fixed wing 7 to the high-lift device 15 is interrupted. The high-lift device 15 is thus decoupled from the fixed wing 7 in the region of the hold-down arrangement 27 and the trailing edge 22 of the high-lift device 15 can detach from the upper surface 19 of the fixed wing 7.

Figure 6:
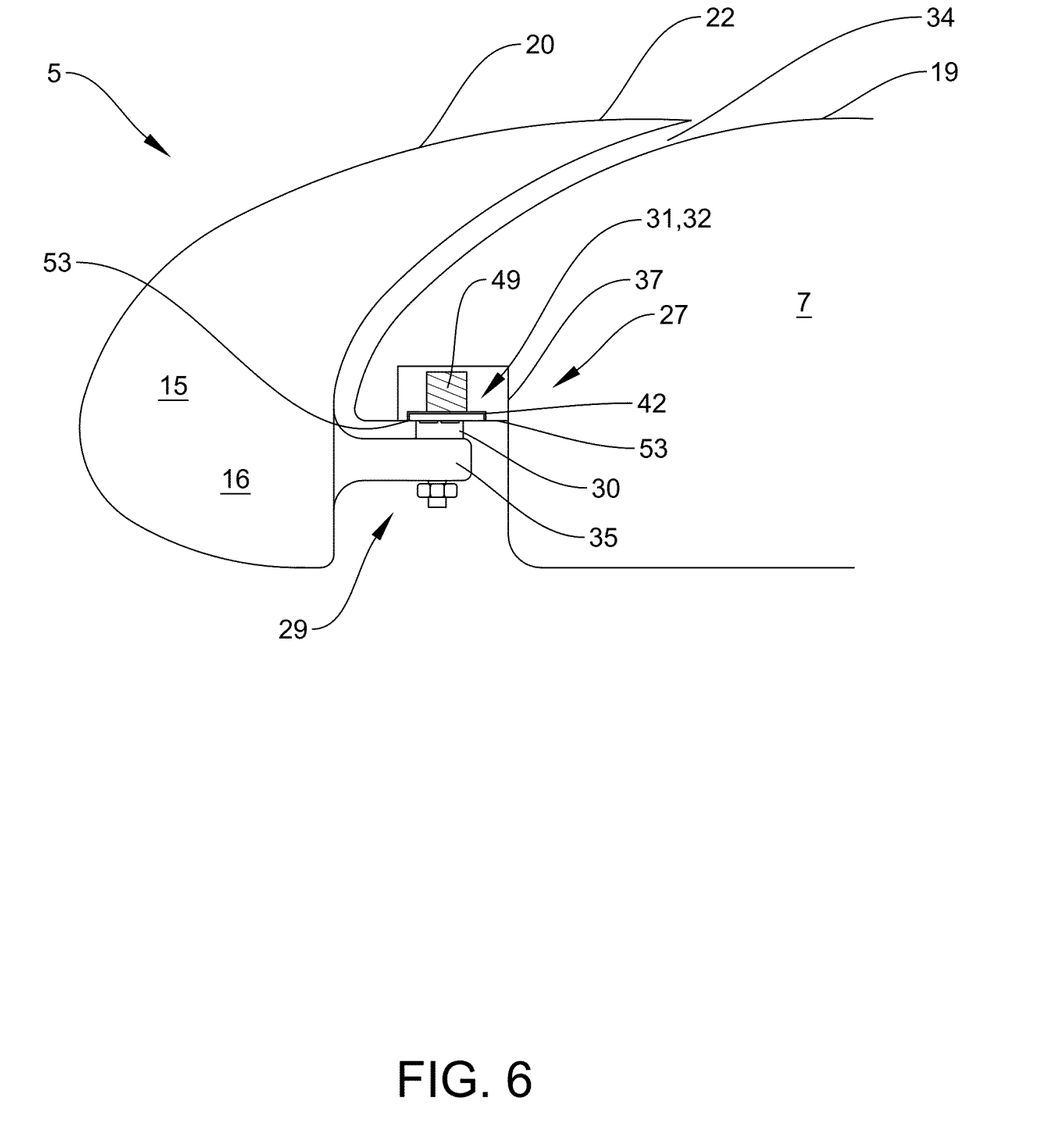
FIG. 6 shows a sectional drawing of another exemplary embodiment of a wing comprising another exemplary embodiment of a hold-down arrangement.

FIG. 6 shows another exemplary embodiment of a wing 5 comprising an exemplary embodiment of a hold-down arrangement 27. The wing 5 and the hold-down arrangement 27 of FIG. 5 only differ from the wing 5 and the hold-down arrangement 27 of FIGS. 4a, 4b and 5 in that no hydraulic device is interposed between the biasing means 49 and the contact element 42. Thus, the description of the embodiments of FIG. 6 will be limited to those aspects that differ from the embodiment of FIGS. 4a, 4b and 5. FIG. 6 may show a cut through the wing 5 shown in FIGS. 2 and 3 along the dashed line 33 and shows the wing 5 in the same configuration as shown in FIG. 4b.

In the embodiment of FIG. 6 the biasing means directly acts onto the contact element 42 which is in contact with the rigid hold-down element 30 and an end stop 53 when the high-lift device is in its retracted position as shown in FIG. 6. The end stop 53 in not shown in FIGS. 4a, 4b and 5 but may also be part of these embodiments. It limits the path of the contact element 42 towards the rigid hold-down element 30 attached to the high-lift device 15. Note that the rigid hold-down element is adjustable such that the position of the high-lift device 15 relative to the fixed wing 7 can be adjusted by maintenance personal. While not shown in FIGS. 4a, 4b and 5, the first hold-down element 29 of the embodiments shown therein is also adjustable.

While the aircraft is operating under regular conditions during which the hold-down load does not exceed the operational threshold, a biasing load exerted by the biasing means 49 onto the contact element 42 exceeds the load which the rigid hold-down element 30 exerts on the contact element 42. When the operational threshold is exceeded, the load exerted by the rigid hold-down element 30 onto contact element 42 exceeds the biasing load, the biasing means 49 deforms elastically and the high-lift device 15 is no longer forced to deform with the fixed wing 15. However, as the biasing means 49 continues to act onto the contact element 42, the load onto the high-lift device 15 is not immediately released so that sudden load changes are advantageously avoided.

The invention claimed is:

1. A wing for an aircraft, comprising:
   a fixed wing with a leading edge extending along a spanwise direction of the fixed wing and an upper surface forming a suction side of the fixed wing,
   a high-lift device movable between a retracted position and a deployed position and attached to the leading edge of the fixed wing via a first support and a second support, wherein the first support is spaced apart from the second support in the spanwise direction and wherein in the retracted position a trailing edge of the high-lift device is in contact with the upper surface of the fixed wing, and
   a hold-down arrangement arranged between the first support and the second support and comprising a first hold-down element attached to the high-lift device and a second hold-down element attached to the fixed wing, wherein the hold-down arrangement is configured such that the first hold-down element is in contact with the second hold-down element when the high-lift device is in the retracted position but is not in contact with the second hold-down element when the high-lift device is in the deployed position and wherein in the retracted position of the high-lift device the hold-down arrangement prevents the trailing edge of the high-lift device from detaching from the upper surface of the fixed wing when the fixed wing deforms in the spanwise direction,
   wherein one of the first hold-down element and the second hold-down element is a load-limited hold-down element and the one of first hold-down element and the second hold-down element not being the load-limited hold-down element is a rigid hold-down element,
   wherein the load-limited hold-down element comprises an elastically deformable biasing means and a contact element, wherein when the high-lift device is in the retracted position the contact element is in contact with the rigid hold-down element and the biasing means biases the contact element towards the rigid hold-down element with a biasing load, wherein the load-limited hold-down element is configured such that a hold-down load transferred through the hold-down arrangement for preventing the trailing edge of the high-lift device from detaching from the upper surface of the fixed wing is transferred through the biasing means and the contact element onto the rigid hold-down element, wherein the biasing means is further configured such that when the hold-down load does not exceed an operational threshold, a load exerted by the rigid-hold-down element onto the contact element does not exceed the biasing load so that the trailing edge of the high-lift device is configured to contact the upper surface of the fixed wing, and when the hold-down load exceeds the operational threshold, the load exerted by the rigid hold-down element onto the contact element exceeds the biasing load and the biasing means deforms elastically so that the trailing edge of the high-lift device is configured not to contact the upper surface of the fixed wing, and wherein the load-limited hold-down element further comprises a hydraulic device with a cylinder and a piston defining a first cavity filled with hydraulic fluid, wherein the piston is the contact element of the load-limited hold-down element.

2. The wing according to claim 1, wherein the second hold-down element is the load-limited hold-down element.

3. The wing according to claim 1, wherein the hydraulic device comprises a valve for closing an opening in the cylinder, wherein the valve is configured to be movable between a first position and a second position, wherein in the first position the valve closes the opening and in the second position the valve does not close the opening, wherein when the high-lift device is in the retracted position, the biasing means biases the contact element towards the rigid hold-down element through the hydraulic fluid by biasing the valve towards the first position with the biasing load, and wherein the hydraulic device is further configured such that when the hold-down load does not exceed the operational threshold, a load acting through the hydraulic fluid onto the valve does not exceed the biasing load such that the valve is held in the first position by the biasing means, and when the hold-down load exceeds the operational threshold, a load acting through the hydraulic fluid onto the valve exceeds the biasing load, whereupon the valve moves towards the second position.

4. The wing according to claim 3, wherein the hydraulic device comprises a second cavity, wherein hydraulic fluid displaced out of the first cavity through the opening is received in the second cavity.

5. The wing according to claim 4, wherein the valve is arranged in the second cavity and a position of the valve in the second cavity defines the volume available for receiving hydraulic fluid displaced from the first cavity, wherein when the hold-down load exceeds the operational threshold, the valve is moved relative away from the first position by the hydraulic fluid displaced from the first cavity against the biasing load exerted by the biasing means onto the valve.

6. The wing according to claim 4, wherein the volume of the second cavity exceeds a volume of the first cavity.

7. The wing according to claim 1, wherein the high-lift device is a slat, wherein the first support is a master slat track and the second support is a slave slat track.

8. An aircraft comprising a fuselage and the wing according to claim 1.

* * * * *